United States Patent [19]

Hijiya et al.

[11] Patent Number: 4,562,020
[45] Date of Patent: Dec. 31, 1985

[54] PROCESS FOR PRODUCING SELF-SUPPORTING GLUCAN FILM

[75] Inventors: Hiromi Hijiya; Toshio Miyake, both of Okayama, Japan

[73] Assignee: Kabushiki Kaisha Hayashibara Seibutsu Kagaku Kenkyujo, Okayama, Japan

[21] Appl. No.: 556,957

[22] Filed: Dec. 1, 1983

[30] Foreign Application Priority Data

Dec. 11, 1982 [JP] Japan .................. 57-217196
Aug. 17, 1983 [JP] Japan .................. 58-149993

[51] Int. Cl.[4] .............................. B29D 7/02
[52] U.S. Cl. .................... 264/39; 264/217; 435/101; 435/102
[58] Field of Search ............... 264/212, 213, 22, 217, 264/39; 435/101, 102

[56] References Cited

U.S. PATENT DOCUMENTS

| 3,503,773 | 3/1970 | Bisschops | 264/212 |
| 3,993,840 | 11/1976 | Tsuji et al. | 428/413 |
| 3,997,703 | 12/1976 | Nakashio et al. | 264/217 |
| 4,029,876 | 6/1977 | Beatty | 264/22 |
| 4,042,654 | 8/1977 | Liszyk et al. | 264/22 |
| 4,123,424 | 10/1978 | Credali | 264/212 |
| 4,200,693 | 4/1980 | Yokobayashi et al. | 435/101 |
| 4,202,940 | 5/1980 | Misaki et al. | 435/101 |
| 4,202,966 | 5/1980 | Misaki et al. | 536/1 |
| 4,306,059 | 12/1981 | Yokobayashi et al. | 536/1 |
| 4,389,357 | 6/1983 | Chu | 264/212 |

OTHER PUBLICATIONS

CA 85: 48621 Moldings of Pluran, Hijiya, Hiromi.
CA 91: 20982, Pullulan Films, Matsunaga, Hiroomi.

Primary Examiner—James Lowe
Attorney, Agent, or Firm—Browdy and Neimark

[57] ABSTRACT

A continuous process for producing a self-supporting glucan film, comprises casting an aqueous glucan solution on the surface of a corona-treated endless heat-resistant plastic belt, drying the glucan solution thereon while heating, and releasing the resultant self-supporting glucan film therefrom. Suitable glucans are those which substantially consist of repeating maltotriose units, such as pullulan or elsinan.

10 Claims, 1 Drawing Figure

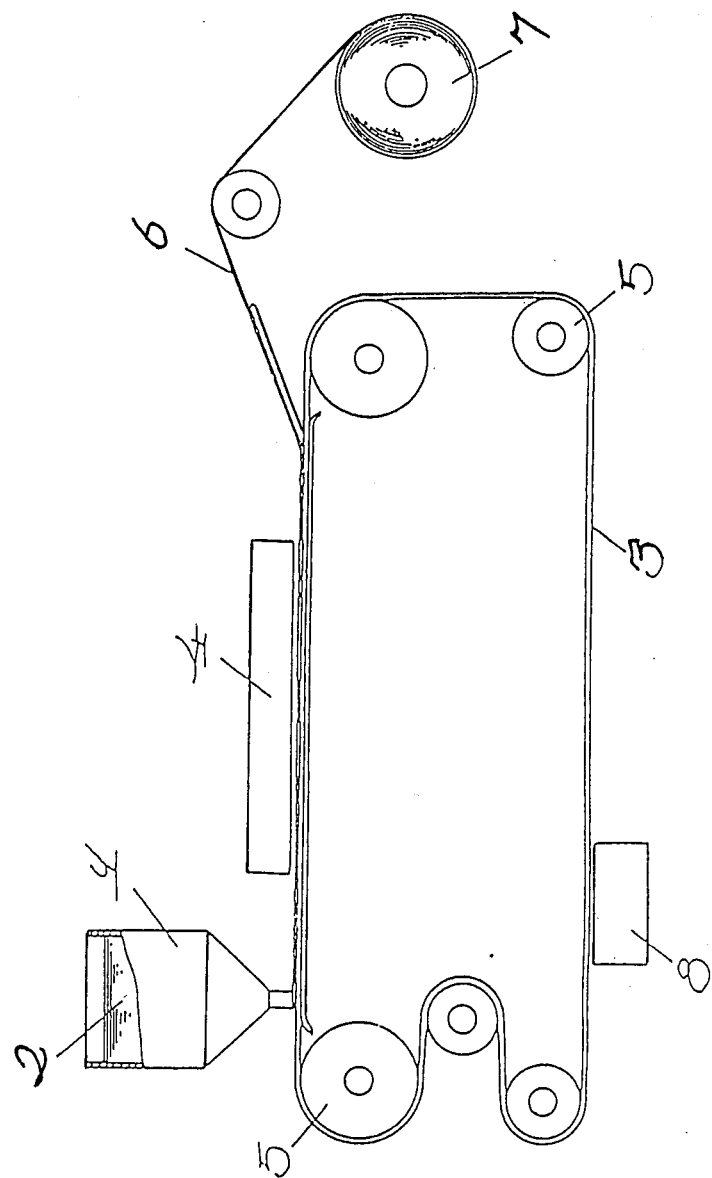

PROCESS FOR PRODUCING SELF-SUPPORTING GLUCAN FILM

FIELD OF THE INVENTION

The present invention relates to a process for producing a film. More particularly, it relates to a continuous process for producing a self-supporting film with a glucan, such as pullulan or elsinan, which substantially consists of repeating maltotriose units. Such glucan will be simply referred to as "glucan" hereinafter.

BACKGROUND OF THE INVENTION

As described, for example, in Japan Patent Publication No. 36,360/76, (corresponding to U.S. Pat. No. 3,827,937) Japan Patent Publication No. 27,561/80 (U.S. Pat. No. 4,202,940 and U.S. Pat. No. 4,202,966) or Japan Patent Kokai No. 121,997/78, the glucan can be produced by culturing a strain of species *Aureobasidium pullulans* or genus Elsinoe on a nutrient medium containing sugars, such as corn syrup or sucrose, under aeration-agitation conditions, removing the cell debris, and recovering and purifying the resultant supernatant or filtrate.

In the production of self-supporting film with the glucan, the use of a high-purity glucan wherein impurities, such as inorganic substance, have been removed as much as possible, is recommended in order to increase its physical strength including tensile or folding strength. Thus, a high-purity glucan having a water-soluble inorganic substance content below 0.01% has been used in conventional self-supporting glucan film.

Film production using an aqueous solution of such high-purity glucan requires a careful selection of casting base so that the glucan solution can be cast thereon to give a uniform layer, and so that the resultant glucan film can be easily released therefrom: For example, an embodiment as disclosed in Japan Patent Publication No. 27,099/80, Japan Patent Kokai No. 13,565/79 (see CA91-20982 or Japan Patent Kokai No. 52,793/79 (U.S. Pat. No. 4,306,059) teaches the use of a metal plate or a chromium-plated metal roll. As apparent from the description of Japan Patent Kokai No. 13,565/79 or 52,793/79, a process comprising casting an aqueous glucan solution on such casting base, however, requires a large amount of fatty acid ester of sucrose as a mold release agent, as well as severe moisture-control during the subsequent step of releasing the resultant glucan film.

Despite of such requirements, a continuous production of self-supporting glucan film using an aqueous glucan solution has been deemed to be very difficult.

Accordingly, there has existed a strong need for a continuous process for producing self-supporting glucan film. As will become apparent from the following, the present invention does meet the need.

SUMMARY OF THE INVENTION

It is one object of the present invention to provide a continuous process for producing a self-supporting glucan film.

Another object of the present invention is to provide a continuous process for producing a self-supporting glucan film which can be practiced with an improved workability.

These and other objects as may appear hereinafter have been attained by the process which comprises casting an aqueous solution of the glucan on the surface of a corona-treated endless heat-resistant plastic belt, drying the glucan solution thereon while heating, and releasing the resultant self-supporting glucan film from the endless belt.

BRIEF EXPLANATION OF THE FIGURE

The FIGURE is given to illustrate an apparatus which can be used in the practice of the present invention.

DESCRIPTION OF THE PREFERRED EMBODIMENTS

For the purpose of overcoming the disadvantages of conventional processes, the present inventors investigated various continuous processes for producing self-supporting glucan film. As a result, the inventors found that a glucan film having a uniform thickness can be easily and continuously formed and obtained with an improved workability by casting an aqueous glucan solution on a corona-treated endless heat-resistant plastic belt, drying the solution thereon while heating, and by releasing the resultant film therefrom. Unexpectedly, the present inventors found that the material glucan, usable in the invention, does not require high purification as required for conventionally cast glucan, and that a self-supporting glucan film having a desirable strength can be obtained with the use of a material glucan having a water-soluble inorganic substance content of 0.02–5.0 w/w % based on its glucan content, without applying severe moisture-control.

A suitable apparatus on which the process can be practiced is shown in the accompanying FIGURE, in which there is provided a storage vessel (1) containing aqueous glucan solution (2). The glucan solution is cast onto a corona-treated endless heat-resistant plastic belt which carries the cast layer of glucan solution beneath a heat-dryer (4). The endless corona-treated heat-resistant plastic belt is supported by a plurality of rotating rolls (5). After passing beneath the heat-dryer (4), the self-supporting glucan film (6) is stripped from the belt and wounded into a roll (7). The heat-resistant plastic belt is then passed by a suitable corona-treatment apparatus (8).

The heat-resistant plastics, as referred to herein, must have a thermoresistance in the range of about 40°–100° C. in order to heat-dry the aqueous glucan solution casted thereon. Although a heat-resistant plastic, for example, polypropylene, polycarbonate or polyester, is usable, the low affinity of these plastics to the glucan solution renders formation of a desirable glucan film having a uniform thickness very difficult.

Accordingly, the present inventors found that a uniform layer of an aqueous glucan solution can be obtained by casting the solution on a plastic film or sheet which has been subjected to a high-voltage discharge-treatment including corona-treatment according to, for example, the method disclosed in Japan Patent Publication No. 12,383/65, and that a glucan film, formed by heat-drying the layer, can be easily released therefrom. Thus, the present inventors found continuous production of quality self-supporting glucan film is attainable with an improved efficiency by continuously casting an aqueous glucan solution on an endless belt of such plastic film or sheet, drying the glucan solution while heating, and releasing the resultant glucan film therefrom.

Although corona-treatment of the endless belt can be carried out prior to shaping the heat-resistant film or sheet into endless form, it may be done after the shaping, or during the operation of the endless belt in a continuous or continual sense in order to avoid its changes on standing.

The aqueous glucan solution, wherein the glucan is the predominant constituent, having an inorganic substance content of 0.02–5.0 w/w %, preferably, 0.04–2.0 w/w %, based on the glucan content, is suitable in the invention. The content of the inorganic substance based on the glucan content (w/w %) is determined as follows: A 0.8 w/v % aqueous solution of a glucan sample is added with three volumes of methanol under ambient conditions to effect precipitation, and the glucan in the resultant precipitant is analyzed by the anthrone method. Then, the glucan content (A) in the sample is determined as its ratio (w/w %) against the weight of the sample. Separately, the sample is carbonized, kept at 600° C. for 16 hours, and analyzed on residual ash. Then, the content of an inorganic substance (B) in the sample is determined as the ratio (w/w %) of the residual ash against the weight of the sample. The content of water-soluble inorganic substance (C) is calculated using the equation:

$$C(w/w \%) = B/A \times 100$$

The aqueous glucan solution may be, if necessary, admixed with one or more ingredients, for example, flavor, coloring agent, seasoning, natural paste, cyclodextrin, protein, fat, vitamin, hormone, antigenic substance, antibiotics, biologically-active substance, virus, microorganism, spore, seed, lecithin, microcapsule and plasticizer, and then heat-dried to obtain the glucan film according to the invention.

The concentration of the aqueous glucan solution generally falls in the range of about 10–50 w/w %, dependent upon the average molecular weight of the glucan constituent. Generally, pullulan or elsinan, having respective average molecular weights in the range of 50,000–5,000,000 or 100,000–10,000,000, is suitable. Preferable depth of the glucan solution layer is in the range of 0.01–0.5 mm. The step of heat-drying can be carried out by ventilation of a warm or hot air of about 40°–100° C. The glucan film, formed by the above described steps, can be easily released from the corona-treated endless heat-resistant plastic belt to yield a self-supporting glucan film.

The following example illustrates the process for producing self-supporting glucan film according to the invention with reference to the FIGURE. An aqueous glucan solution (2) in vessel (1) is continuously transferred by roll (5), and cast by roll (5) on a corona-treated endless heat-resistant plastic belt (3) to give a uniform layer. Thereafter, the aqueous glucan solution (2) is introduced into heat-drier (4), and heat-dried into film (6) on the surface of the endless belt (3). The resultant self-supporting film (6) is released from the endless belt (3), and then wound around roll (7). Thus, a self-supporting glucan film can be continuously produced.

The self-supporting glucan film thus obtained is feasible intact as a water-soluble product, for example, food product, cosmetic or agricultural product. Also, it is advantageously usable as an edible or water-soluble rapping material for various products, for example, food products, cosmetics or medicines.

The present self-supporting pullulan film may be, if necessary, printed, or cut or laminated into a specific shape, prior to its use. In addition, the film is packaged in, for example, aluminium foil or polypropylene film until its use.

Several embodiments according to the invention are given hereinafter.

EXAMPLE 1

A culture medium, consisting of 10 w/v % corn syrup having a Dextrose Equivalent (DE) of 43 on the basis of dry solid, 0.6 w/v % $K_2HPO_4$, 0.1 w/v % NaCl, 0.02 w/v % $MgSO_4.7H_2O$, 0.06 w/v % $(NH_4)_2SO_4$, 0.04 w/v % yeast extract and water, was autoclaved at 120° C. for 20 minutes. After cooling, to the culture medium was inoculated a seed culture of *Aureobasidium pullulans* IFO 6353, and the resultant culture was cultivated at 25° C. for one week under aeration-agitation conditions. After the completion of the cultivation, the culture was centrifuged to remove the cell debris, and the resultant supernatant was decolored by the addition of activated carbon, partially purified by reverse osmosis treatment, and concentrated in usual way to prepare an about 35 w/w % aqueous pullulan solution having an inorganic substance content of about 1.0 w/w % based on the pullulan. The average molecular weight of the pullulan was about $2 \times 10^5$ daltons, and the yield was about 70% based on the material corn syrup.

Thereafter, the pullulan solution was continuously cast on the surface of a corona-treated endless belt of a polyester film, and dried thereon with an about 90° C. hot air, followed by releasing the resultant film. Thus, a 0.04 mm thick self-supporting pullulan film was continuously produced.

This film has an excellent transparency, and is advantageously usable as an edible, water-soluble packaging material.

EXAMPLE 2

A culture medium, consisting of 10 w/v % sucrose, 0.12 w/v % urea, 0.1 w/v % yeast extract, 0.4 w/v % $K_2HPO_4$, 0.08 w/v % $MgSO_4.7H_2O$ and water, was autoclaved at 120° C. for 20 minutes. After cooling the culture medium, a seed culture of *Aureobasidium pullulans* IFO 4464 was inoculated thereon, and cultivated at 27° C. for 5 days. After completion of the cultivation, the resultant culture was filtered to remove the cell debris to obtain a filtrate which was then decolored by the addition of activated carbon, partially purified with ion exchange resins of H- or OH-form, and concentrated in usual way to obtain an about 25 w/w % aqueous pullulan solution having an inorganic substance content of about 0.08 w/w % based on the pullulan. The average molecular weight of the pullulan was about $4 \times 10^5$ daltons, and the yield was about 55% based on the material sucrose.

Thereafter, the aqueous pullulan solution was continuously cast on the surface of a corona-treated endless belt of a polypropylene sheet, and dried with an about 60° C. hot air to continuously obtain a 0.02 mm thick self-supporting pullulan film.

The resultant film has an excellent transparency, and is advantageously usable as an edible, water-soluble packaging material.

EXAMPLE 3

A pullulan solution was prepared by mixing an aqueous pullulan solution, prepared by the method disclosed in EXAMPLE 1, and small amounts of a cherry flavor and an edible red coloring agent.

The resultant mixture was then continuously cast on the surface of a corona-treated endless belt of a polycarbonate film, and dried with an about 80° C. hot air to continuously produce a 0.06 mm thick self-supporting pullulan film.

The resultant product was a pink edible film, and having a cherry flavor.

EXAMPLE 4

A pullulan solution was prepared by mixing an aqueous pullulan solution, prepared by the method disclosed in EXAMPLE 2, and small amounts of an edible green coloring agent and an inclusion complex of L-menthol and $\beta$-cyclodextrin.

The mixture was continuously cast on the surface of a corona-treated endless belt of a polyester sheet, and dried thereon with an about 85° C. hot air to continuously produce a 0.03 mm thick self-supporting pullulan film.

The resultant product was a green edible film having a menthol flavor.

EXAMPLE 5

A pullulan solution was prepared by mixing an aqueous pullulan solution, prepared by the method disclosed in EXAMPLE 1, and small amounts of an edible brown coloring agent and an inclusion complex of cinnamaldehyde and $\alpha$-cyclodextrin.

The resultant mixture was continuously cast on the surface of a corona-treated endless belt of a polyester film, and dried thereon with an about 95° C. hot air to continuously produce a 0.03 mm thick self-supporting pullulan film.

The resultant product was a brown edible film having a cinnamon flavor.

EXAMPLE 6

A liquid medium, consisting of 5 w/v % sucrose, 0.2 w/v % yeast extract, 0.5 w/v % corn steep liquor, 0.05 w/v % $K_2HPO_4$, 0.05 w/v % $MgSO_4.7H_2O$, 0.001 w/v % $FeSO_4.7H_2O$ and water, was autoclaved at 120° C. for 20 minutes. After cooling, the culture medium was adjusted to pH 6.0, and inoculated with a seed culture of *Elsinoe fawcetti* IFO 8417, followed by 5-day cultivation at 24° C. under aeration-agitation conditions. After the completion of the cultivation, the resultant culture was centrifuged to remove the cell debris, and the supernatant was decolored by the addition of activated carbon, partially purified by reverse osmosis treatment, and concentrated in usual way to prepare an about 15 w/w % aqueous elsinan solution having an inorganic substance content of about 1.0 w/w % based on the elsinan. The average molecular weight of the elsinan was about $4 \times 10^6$ daltons, and the yield was about 40% based on the sucrose.

Thereafter, the elsinan solution was continuously cast on the surface of a corona-treated endless belt of a polyester film, and dried thereon with an about 60° C. hot air, followed by releasing the resultant film. Thus, a 0.02 mm thick self-supporting elsinan film was continuously produced.

This film has an excellent transparency, and is advantageously usable as an edible, water-soluble packaging material.

EXAMPLE 7

A liquid medium, consisting of 4 w/v % powder syrup (DE 30), 0.3 w/v % wheat germ, 0.1 w/v % $NH_4NO_3$, 0.1 w/v % $K_2HPO_4$, 0.05 w/v % $MgSO_4.7H_2O$, 0.05 w/v % KCl, 0.0001 w/v % $MnSO_4.4H_2O$ and water, was autoclaved at 120° C. for 20 minutes. After cooling, the culture medium was adjusted to pH 7.0, and a seed culture of *Elsinoe leucospila* FERM-P No. 3874 was inoculated thereon, followed by 4-day cultivation at 27° C. under aeration-agitation conditions. After the completion of the cultivation, the resultant culture was filtered to remove the cell debris to obtain a filtrate which was then decolored by the addition of activated carbon, partially purified with ion exchange resins of H- or OH-form, and concentrated in usual way to obtain an about 20 w/w % aqueous elsinan solution having an inorganic substance content of about 0.06 w/w % based on the elsinan. The average molecular weight of the elsinan was about $1 \times 10^6$ daltons, and the yield was about 65% based on the starting sucrose.

Thereafter, the aqueous elsinan solution was continuously cast on the surface of a corona-treated endless belt of a polypropylene sheet, and dried with an about 80° C. hot air to continuously produce a 0.03 mm thick self-supporting pullulan film.

The resultant film has an excellent transparency, and is advantageously usable as an edible, water-soluble packaging material.

EXAMPLE 8

A 0.06 mm thick self-supporting elsinan film was prepared similarly as in EXAMPLE 3, except that the pullulan solution was replaced with an elsinan solution prepared by the method disclosed in EXAMPLE 6.

The resultant product was a pink edible film having a cherry flavor.

EXAMPLE 9

A 0.03 mm thick self-supporting elsinan film was prepared similarly as in EXAMPLE 4, except that the pullulan solution was replaced with an elsinan solution prepared by the method disclosed in EXAMPLE 7.

The resultant product was a green edible film having a menthol flavor.

EXAMPLE 10

A 0.03 mm thick self-supporting elsinan film was prepared similarly as in EXAMPLE 5, except that the pullulan solution was replaced with an elsinan solution prepared by the method disclosed in EXAMPLE 6.

The resultant product was a brown edible film having a cinnamon flavor.

While the preferred embodiments of the present invention have been described, it is to be understood that modifications will be apparent to those skilled in the art without departing from the spirit of the invention.

What is claimed is:

1. A process for producing self-supporting film of a glucan consisting essentially of repeating maltotriose units, said process consisting essentially of:
   providing an aqueous solution of the glucan having a concentration in the range of 10–50 w/w % and an inorganic substance content in the range of 0.02–5.0 w/w %;
   casting the solution on a corona-treated endless heat-resistant plastic belt to give a uniform layer having a depth in the range of 0.01–0.5 mm;
   drying the solution thereon while heating with 40°–100° C. air; and
   releasing the resultant self-supporting film therefrom.

2. A process for producing self-supporting monolayered film of a glucan consisting essentially of repeating maltotriose units, said process consisting essentially of:

casting an aqueous solution of the glucan having an inorganic substance content in the range of 0.02–5.0 w/w % on a traveling corona-treated endless heat-resistant plastic belt to give a uniform and continuous layer of the aqueous solution;

drying the layer of the aqueous solution on the traveling endless belt while heating; and releasing the resultant self-supporting film from the endless belt.

3. A process as set forth in claim 2, wherein said belt is made of a polypropylene, polyester or polycarbonate.

4. A process as set forth in claim 2, wherein the glucan concentration in the aqueous solution is in the range of 10–50 w/w %.

5. A process as set forth in claim 2, wherein said glucan is a member selected from the group consisting of pullulan, elsinan and mixtures thereof.

6. A process as set forth in claim 5, wherein the average molecular weight of the pullulan is in the range of 50,000–5,000,000.

7. A process as set forth in claim 5, wherein the average molecular weight of the elsinan is in the range of 100,000–10,000,000.

8. A process as set forth in claim 2, wherein said aqueous solution is casted on the belt to give a uniform layer having a depth in the range of 0.01–0.5 mm.

9. A process as set forth in claim 2, wherein the layer of the aqueous solution is dried with a 40°–100° C. air.

10. A process as set forth in claim 2, wherein said self-supporting film contains a member selected from the group consisting of flavor, coloring agent, seasoning, natural paste, cyclodextrin, protein, fat, vitamin, hormone, antigenic substance, antibiotics, biologically-active substance, virus, microorganism, spore, seed, lecithin, microcapsule, plasticizer and mixtures thereof.

* * * * *